United States Patent [19]

Turtle

[11] 3,824,583

[45] July 16, 1974

[54] APPARATUS FOR DIGITIZING NOISY TIME DURATION SIGNALS

[75] Inventor: Quentin C. Turtle, Cranston, R.I.

[73] Assignee: General Signal Corporation, Rochester, N.Y.

[22] Filed: Nov. 5, 1971

[21] Appl. No.: 196,033

[52] U.S. Cl. ..... 340/347 R, 307/247 A, 340/365 E, 235/92 T

[51] Int. Cl. .......................................... H03k 13/00

[58] Field of Search ..... 340/347 AD, 347 R, 365 E, 340/171 R, 168 R; 235/92 T, 92 TF, 92 F; 324/181; 328/129, 131; 307/247 A

[56] References Cited

UNITED STATES PATENTS 3,466,647 9/1969 Guzak, Jr. ....................... 340/365 E 3,611,298 10/1971 Jacobson ....................... 340/171 R

*Primary Examiner*—Charles D. Miller

*Attorney, Agent, or Firm*—Jeffrey S. Mednick

[57] ABSTRACT

The disclosure relates to apparatus for transducing time duration signals into digital form and concerns a scheme for preventing contact bounce noise in said signals from triggering the production of the control pulses needed for the transducing process. The scheme includes a one-shot multivibrator which produces an output pulse of longer duration than the bounce period whenever the signal reverts to its reference level, and apparatus which senses both said output pulse and the time duration signal and produces a control pulse only when the trailing edge of said output pulse occurs at a time when the signal is at its reference level.

3 Claims, 2 Drawing Figures

PATENTED JUL 16 1974 3,824,583

APPARATUS FOR DIGITIZING NOISY TIME DURATION SIGNALS

BACKGROUND AND SUMMARY OF THE INVENTION

The co-pending application of Pasco A. Coia, Ser. No. 199,178, filed Nov. 16, 1971, discloses a telemetric receiver for cyclic, time duration signals in which each signal is transduced to digital form and then converted to an analog curren which is used as the input to a positioner for a readout element, such as a pen recorder. In the digitizing operation, the time duration signal controls a clock pulse gate whose output is supplied to a binary counter, and then, after the trailing edge of the signal has passed, the count is transferred to a memory register, and the counter is reset to zero preparatory to receipt of the next time duration signal. The transfer and reset steps require pulses which are synchronized with the trailing edge of the time duration signal, and which are generated in response to the voltate excusion which takes plate at that edge.

The transmitted signal commonly is produced by a cyclically operated switch in the transmitter, and, in the case of the preferred form of the receiver just mentioned, it is introduced to the receiving apparatus through a line isolation relay. Therefore, the time duration signal which is to be transduced usually has transient portions adjacent its leading and trailing edges in which the voltage fluctuates between reference and signal levels, and which are attributable to bouncing of the switch and relay contacts. Some of the transient voltage excursions have the same sense as the steady state voltage excursion which occurs at the end of the signal and which is intended to trigger the production of control pulses. Consequently, if the noisy signal is applied directly to the control pulse generators, spurious transfer and reset pulses will be generated, and proper operation of the digitizing equipment will be precluded. It is evident that this condition can be rectified by delivering the time duration signal to the conversion and control pulse-generating equipment through a low-pass filter. However, that solution is considered unacceptable because these filters inherently change the width of the signal and thus impair the transducing accuracy of the receiver.

It is the object of this invention to provide an economical way of preventing the generation of spurious control pulses without impairing the accuracy of the analog-to-digital conversion process. According to this invention, the control pulse-generating equipment is associated with a special masking circuit which includes a one-shot multivibrator to which the time duration signal is applied, and which produces an output pulse whenever the signal voltage reverts to its reference level. The duration of this output pulse is longer than the transient bounce period, so only one such pulse can be produced at the beginning or the end of each time duration signal. The masking circuit also includes apparatus which senses both the time duration signal and the output pulse of the one-shot and causes a control pulse to be produced only if the signal is at its reference level at the instant the trailing edge of the one-shot output pulse is received. This arrangement insures synchronism between the control pulse and the trailing edge of the time duration signal, and thereby precludes generation of spurious pulses. Moreover, since this solution to the bounce problem does not require any alteration of the width of the time duration signal, transducing accuracy is not affected.

BRIEF DESCRIPTION OF THE DRAWINGS

One specific embodiment of the invention is described herein with reference to the accompanying drawing in which.

DESCRIPTION OF THE ILLUSTRATED EMBODIMENT

Figure 1:
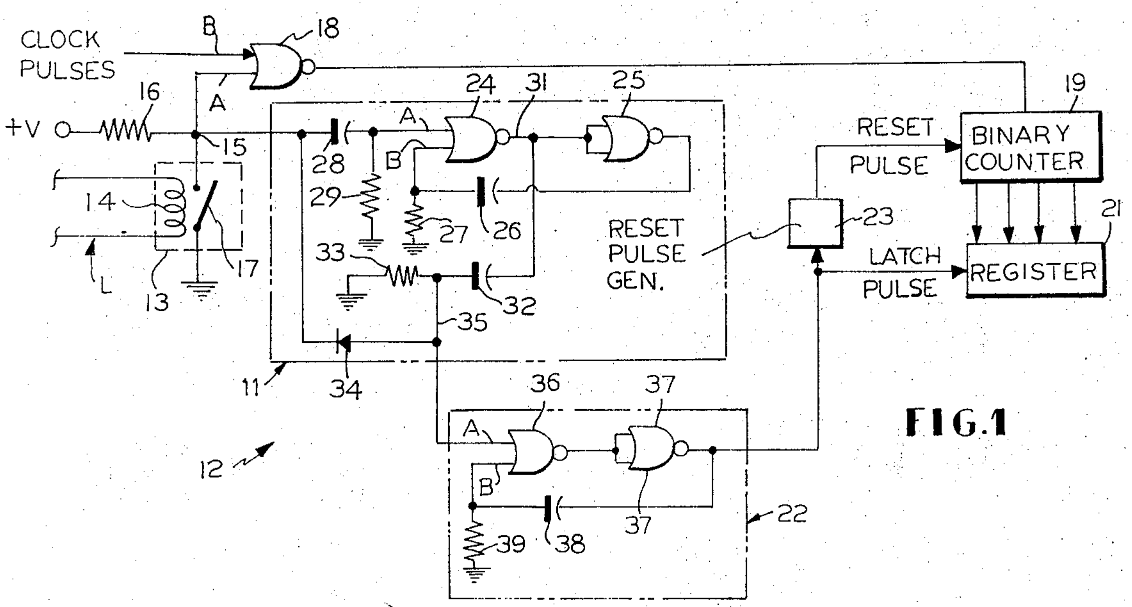
FIG. 1 is a simplified schematic wiring diagram of the marking circuit incorporated in the receive of the application mentioned above.

As shown in FIG. 1, the masking circuit 11 is embodied in a telemetric receiver 12 having a line isolation relay 13 whose coil 14 is connected with the conductors of a transmission line L leading from a transmitter (not shown). Relay 13 has an output connection 15 which is joined to a source of DC voltage through an isolation resistor 16, and which is selectively connected with a source of more negative voltage, indicated by a ground symbol, through the normally open relay contact 17. The relay 13 is energized by the transmitted time duration signal, so the voltage at connection 15 will be at the lower level for the duration of each such signal, and will be at the higher level during the interval between signals. For convenience, these levels will be referred to hereafter by their binary logic equivalents of 0 and 1.

The time duration signals at connection 15 are supplied to the A input of a NOR gate 18 where they serve to control entry of clock pulses into a binary counter 19. The clock pulses are referenced to the same 0 and 1 voltage scale as the voltage at connection 15, so delivery of clock pulses to counter 19 occurs only during the time that a transmitted signal is being received. After the trailing edge of that signal has passed, the count is transferred to a memory register 21, and counter 19 is reset to zero. These transfer and reset actions are initiated by latch and reset pulses produced by generators 22 and 23, respectively, under the control of masking circuit 11. Ultimately, the count stored in register 21 is converted to an analog electrical current which is utilized to control a readout positioner, as fully explained in the co-pending application mentioned earlier.

The illustrating masking circuit 11 comprises a pair of NOR gates 24 and 25 and a differentiator consisting of capacitor 26 and resistor 27 which are interconnected to form a one-shot multivibrator. The input to the multivibrator is taken from a differentiator which consists of capacitor 28 and resistor 29 and which is supplied with the signals produced at relay output connection 15. The resistors 27 and 29 are so sized that both inputs of NOR gate 24 are biased to the 0 level; therefore it follows that only positive-going voltage transitions at connection 15 will cause the multivibrator to produce an output pulse. The time constant of differentiator 26, 27 is larger than the time constant of differentiator 28, 29 and is sized to maintain the B input of gate 24 at the 1 level for a period longer than the bounce period. The output pulse of the multivibrator is taken from the output connection 31 of gate 24 and is supplied to an interrogation network comprising a third differentiator, consisting of capacitor 32 and resistor 33, and a blocking diode 34 which is interposed in a connection leading from relay output connection 15 to differentiator output connection 35. Diode 34 is oriented to inhibit the creation of a positive-going pulse at connection 35 whenever connection 15 is at the 0 voltage level. The reason for this will be evident from the description of operation which follows. The pulses generated at connection 35 are utilized to trigger latch pulse generator 22, which consists of a one-shot multivibrator defined by NOR gates 36 and 27 and a differentiator 38, 39.

Figure 2:
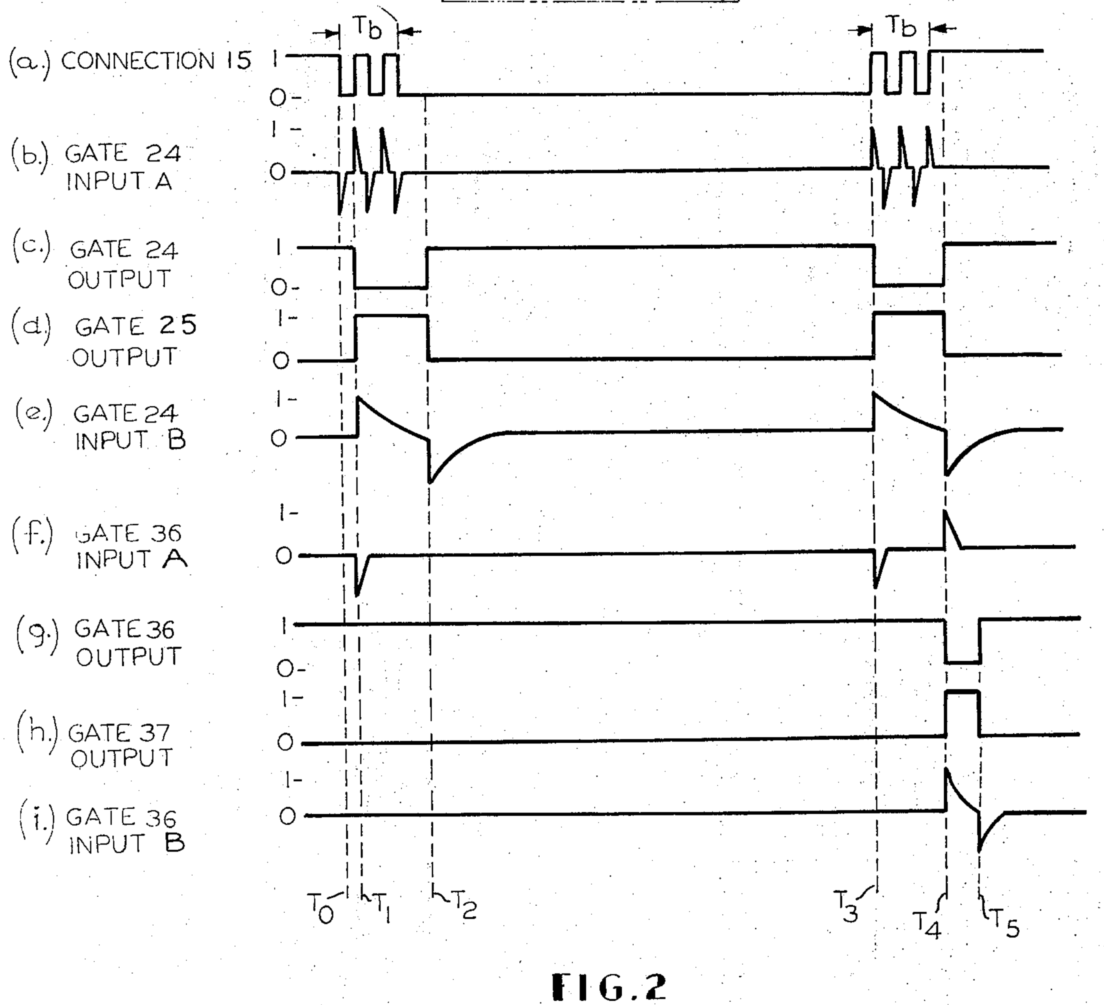
FIG. 2 is a graph showing the wave forms at various points in the apparatus of FIG. 1.

The operation of the illustrated embodiment will be described using the wave forms depicted in FIG. 2. When the leading edge of the telemetered signal is received at time $I_0$, relay 13 is energized to close contact 17 and thereby cause the voltage at connection 15 to drop from the 1 to the 0 level (see wave form a). This negative-going pulse causes differentiator 28, 29 to apply a corresponding voltage spike to the A input of gate 24 (see waveform b), but, since this input is biased to the 0 level, the spike will not produce a change in the output of the gate (see wave form c). Because of contact bounce at the transmitter switch or at relay 13, or at both locations, the leading edge of the time duration signal is followed immediately by a short transient period $T_b$ in which the voltage at connection 15 oscillates back and forth between the 0 and 1 levels. The first operative excursion of the voltage occurs at time $T_1$, and this change causes differentiator elements 28, 29 to raise the voltage at the A input of gate 24 to the 1 level. As a result, gate 24 produces a negative output pulse (see wave form c), and gate 25 produces a positive output pulse (see wave form d). The output pulse from gate 25 is coupled to the B input of gate 24 through differentiator 26, 27, thereby raising this input to the 1 level (see wave form e). The network 26, 27 has a longer time constant than network 28, 29, so the width $T_2$-$T_1$ of the output pulses of gates 24 and 25 depends upon the length of time that the B input of gate 24 remains at the 1 level. The bounce period $T_b$ in a typical case has a duration on the order of 40–50 milliseconds, so the time constant of elements 26, 27 is selected to hold the B input of gate 24 at the 1 level for a slightly longer time (e.g., 60 milliseconds). Thus, only the first positive excursion of the voltage at connection 15 produces output pulses from gates 24 and 25.

The output pulse developed by gate 24 is delivered to connection 35 through differentiator 32, 33. The leading edge of this pulse subjects the A input of gate 36 to a negative-going voltage spike (see wave form f), but, since, as in the case of gate 24, both inputs of gate 36 are biased to the 0 level, this spike does not produce a change in the output of gate 36 (see wave form g). The trailing edge of the output pulse of gate 24 tends to develop a positive-going voltage spike at the A input of gate 36; however, since this trailing edge occurs at a time $T_2$ when the voltage at connection 15 has stabilized at the 0 level, diode 34 conducts and prevents development of the positive voltage at connection 35. As a result, the A input of gate 36 is not subjected to the positive-going pulse needed to change the output of the gate. Consequently, the output of gate 37 (see wave form h) remains constant at the 0 level, and no latch pulse is delivered to register 21 and reset pulse generator 23.

When the trailing edge of the telemetered signal is received (i.e., time $T_3$), relay 13 is de-energized, and contact 17 opens. Now, the voltage at connection 15 reverts to the 1 level. As before, steady state conditions are established only after a transient bounce period $T_b$ in which the voltage at connection 15 fluctuates between the 1 and 0 levels. The positive-going voltage excursion which occurs at time $T_3$ raises the voltage at the A input of gate 24 to the 1 level and causes gates 24 and 25 to produce negative and positive output pulses, respectively (see wave forms b, c and d). The width $T_4$-$T_3$ of these pulses is determined by the time constant of network 26, 27, and therefore is the same as the width of the corresponding pulses produced at time $T_1$. As before, the leading edge of the output pulse developed by gate 24 merely drives the voltage at the A input of gate 36 (see wave form f) to a more negative level and causes no change in the output of pulse generator 22. However, now the trailing edge of the output pulse from gate 24 occurs at a time $T_4$ when the voltage at connection 15 is at the 1 level, and diode 34 is reversed biased. Therefore, this edge of the output pulse raises the voltage at the A input of gate 36 to the 1 level, and thereby causes this gate and gate 37 to produce output pulses (see wave forms g and h). The width $T_5$-$T_4$ of these pulses is, of course, determined by the time constant of network 38, 39. The output of gate 37 is the latch pulse, and it effects transfer of the count from counter 19 to register 21 and also triggers generator 23 to produce the pulse needed to reset the counter. Since the disclosed circuit inherently provides a time delay between the end of the bounce period $T_b$ and the production of the latch pulse, it will be evident that the count necessarily will be complete before it is transferred.

It should be noted that, while the fluctuations in the voltage at connection 15 which occur during the bounce period immediately following time $T_0$ will cause gate 18 to block delivery of some clock pulses to counter 19, the pulses lost at that time are offset, at least to some extent, by the extra clock pulses which pass into the counter during the bounce period immediately following time $T_3$. In a typical receiver, the clock pulse frequency is such that the maximum signal to be processed represents about 800–900 pulses, so any pulses lost as a result of bounce effects can be neglected. Therefore, for all practical purposes, the digital count will be proportional to the width $T_3$-$T_0$ of the telemetered signal.

Although the description herein assumes that the bounce periods at the beginning and end of the time duration signal are of equal duration, in actual practice the one adjacent the trailing edge, which is attributable to opening movement of a contact, is shorter. Therefore, in most installations, the time constant of network 26, 27 is sized with respect to the bounce period adjacent the leading edge.

I claim:

1. Apparatus for processing noisy time duration signals which have stable portions represented by a first voltage level and may have transient portions adjacent their leading and trailing edges in which the voltage fluctuates between said first level and a reference level, the apparatus including a. converting means connected to receive said noisy time duration signals and transduce each into digital form, the converting means requiring for each time duration signal a control pulse which is synchronized to the trailing edge of each time duration signal;

b. means including a one-shot multivibrator, which also receives said noisy time duration signals and produces an output pulse whenever one of the time duration signals changes from the first level to the reference level, the one-shot multivibrator means comprising two NOT-TYPE logic gates each of which has two inputs, a differentiator connected to receive said time duration signals and to supply its output to one input of the first gate, a second differentiator connected to receive the output of the second gate and to supply pulses to the other input of the first gate, and connections for supplying the output of the first gate to both inputs of the second gate;

c. the duration of the output pulse being longer than said transient portions; and d. means which senses said time duration signals and said output pulse and inhibits said control pulse except when the trailing edge of the output pulse occurs at a time when the signal is at the reference level, the sensing means comprising a third differentiator connected to receive the output of said first gate and having an output connection to which said signals are applied through a blocking diode, and a control pulse generator which is connected to be triggered by pulses produced in said output connection.

2. Apparatus as defined in claim 1 in which a. the first voltage level is more negative than the reference voltage level;

b. the two gates are NOR gates; and c. the blocking diode is oriented to block current flow to the output connection of the third differentiator.

3. Apparatus as defined in claim 2 in which a. said control pulse generator comprises third and fourth NOR gates connected to form a one-shot multivibrator in which the output of the third gate is applied to both inputs of the fourth gate and the output of the fourth gate is applied to one input of the third gate through a fourth differentiator; and b. the output connection of the third differentiator is joined to th other input of the third gate.

* * * * *